US012661759B2

(12) United States Patent
Dominguez, Jr.

(10) Patent No.: US 12,661,759 B2
(45) Date of Patent: Jun. 23, 2026

(54) WINDSHIELD REMOVAL TOOL

(71) Applicant: Eliseo Dominguez, Jr., Los Angeles, CA (US)

(72) Inventor: Eliseo Dominguez, Jr., Los Angeles, CA (US)

( * ) Notice: Subject to any disclaimer, the term of this patent is extended or adjusted under 35 U.S.C. 154(b) by 91 days.

(21) Appl. No.: 18/962,626

(22) Filed: Nov. 27, 2024

(65) Prior Publication Data

US 2026/0091472 A1 Apr. 2, 2026

Related U.S. Application Data

(60) Provisional application No. 63/700,826, filed on Sep. 30, 2024.

(51) Int. Cl.
*B25B 11/00* (2006.01)
*B26D 1/547* (2006.01)

(52) U.S. Cl.
CPC ............ *B25B 11/007* (2013.01); *B26D 1/547* (2013.01)

(58) Field of Classification Search
CPC . Y10T 83/929; Y10T 83/472; Y10T 83/4722; Y10T 83/4725; Y10T 83/0443; Y10T 83/0453; B26D 1/547; B26D 1/5475; B26D 7/18; B25B 11/005; B25B 11/007; B26B 27/00; B26B 27/002
See application file for complete search history.

(56) References Cited

U.S. PATENT DOCUMENTS 5,622,093 A * 4/1997 Hutchins ............... B26B 27/002 30/372
2012/0227896 A1* 9/2012 Clabunde ............... B26D 1/547 156/193
2020/0198165 A1* 6/2020 Hauser ................... B26D 1/547
2023/0150161 A1* 5/2023 Dick ........................ B26D 7/18 29/281.1

* cited by examiner

*Primary Examiner* — Phong H Nguyen
(74) *Attorney, Agent, or Firm* — Plager Schack LLP; Mark H. Plager; Kara K. Verryt

(57) ABSTRACT

A windshield removal tool for removing a windshield from a vehicle may include a main plate having a large orifice and two smaller circular orifices extending therethrough; a pair of rotatable spools supported within a respective smaller orifice, such that the spools each extend outward from the top surface of the main plate; a handle mounted to the top surface of the main plate; a suction cup engaged with the large orifice, such that the suction cup extends outward from the bottom surface of the main plate; a clevis pin removably engaged with at least one of the rotatable spools; an adapter port extending into a top surface of each of the rotatable spools, the adapter port configured to removably accommodate insertion of an external tool therein, the external tool configured to rotate the spool; and a cord operatively attached to and extending between the spools.

9 Claims, 6 Drawing Sheets

WINDSHIELD REMOVAL TOOL

RELATED APPLICATION

This application claims priority to provisional patent application U.S. Ser. No. 63/700,826 filed on Sep. 30, 2024, the entire contents of which is herein incorporated by reference.

BACKGROUND

The embodiments herein relate generally to tools and, more particularly, to a windshield removal device.

Conventional windshield removal tools tend to fall apart with use, and the line tends to get jammed in between the spool and the tool body. This can result in the line snapping, particularly when there is too much torque applied. As such, parts must be replaced frequently or a new tool must be purchased. The existing windshield removal tools also require specialized tools for use thereof and, if the specialized tools are lost, the removal tool is rendered useless.

Therefore, what is needed is a rugged windshield removal tool that does not require maintenance (or requires minimal maintenance), does not require the use of other special tools, and can be used either right- or left-handed.

SUMMARY

Some embodiments of the present disclosure include a windshield removal tool for removing a windshield from a vehicle. The windshield removal tool may include a main plate having a large orifice and two smaller circular orifices extending therethrough; a pair of rotatable spools supported within a respective smaller orifice, such that the spools each extend outward from the top surface of the main plate; a handle mounted to the top surface of the main plate; a suction cup engaged with the large orifice, such that the suction cup extends outward from the bottom surface of the main plate; a clevis pin removably engaged with at least one of the rotatable spools; an adapter port extending into a top surface of each of the rotatable spools, the adapter port configured to removably accommodate insertion of an external tool therein, the external tool configured to rotate the spool; and a cord operatively attached to and extending between the spools.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

Figure 1:
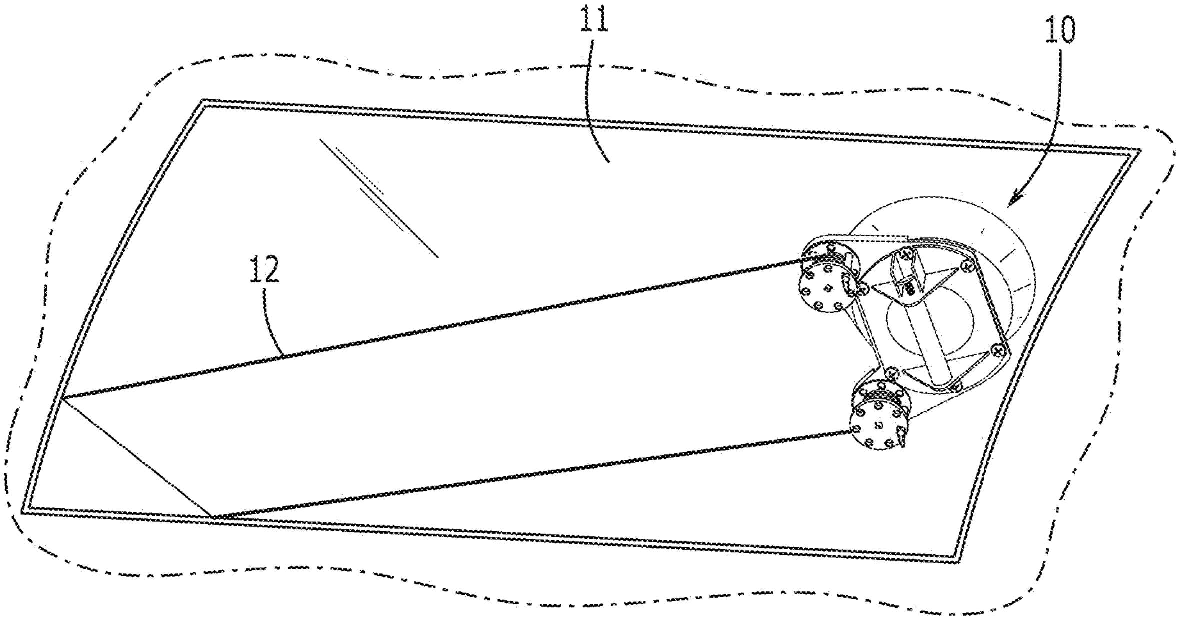
FIG. 1 is a front schematic view of one embodiment of the present disclosure, shown in use.

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as to remove windshields from vehicles and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

By way of example, and referring to FIGS. 1-13, some embodiments of the present disclosure include a windshield removal tool 10 for removing a windshield 11 from a vehicle, the windshield removal tool 10 comprising a main plate 14 with a top surface and a bottom surface, the main plate 14 having a large orifice 15 and two smaller circular orifices 17 extending therethrough; a pair of rotatable spools 16, each spool 16 supported within a respective smaller orifice 17 of the two smaller circular orifices 17, such that the spools 16 each extend outward from the top surface of the main plate 14; a handle plate 21 mounted to the top surface of the main plate 14 over the large orifice 15, the handle plate 21 including a handle 22 extending from a top surface thereof; a suction cup 24 engaged with the large orifice 15, such that the suction cup 24 extends outward from the bottom surface of the main plate 14; a clevis pin 30 removably engaged with one of the rotatable spools 16; an adapter port 16D extending into a top surface of each of the rotatable spools 16, the adapter port 16D configured to removably accommodate insertion of a tool therein, the tool configured to rotate the spool 16; and a cord 12 operatively attached to and extending between the spools 16.

Figure 3:
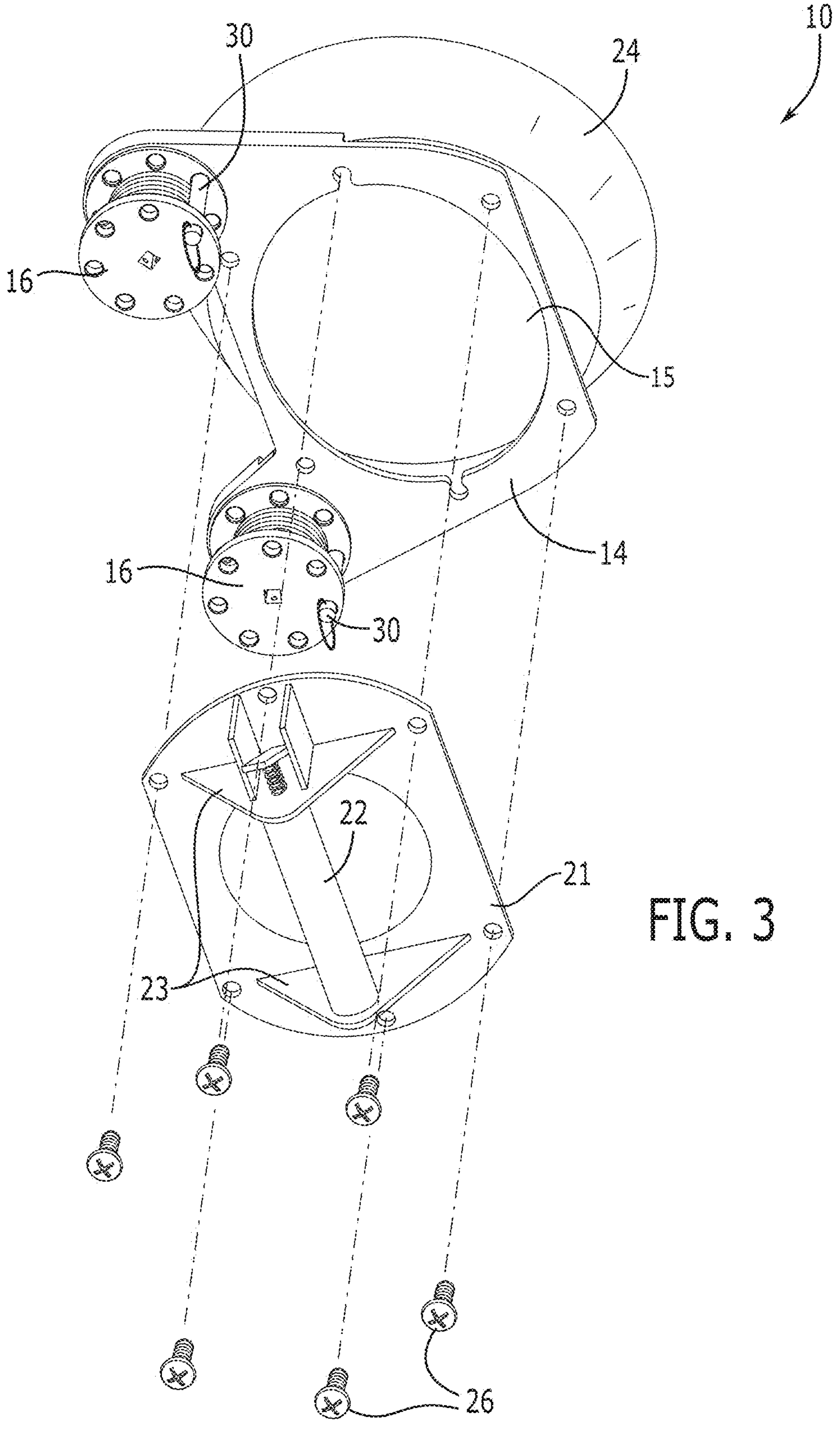
FIG. 3 is an exploded perspective view of one embodiment of the present disclosure.
Figure 4:
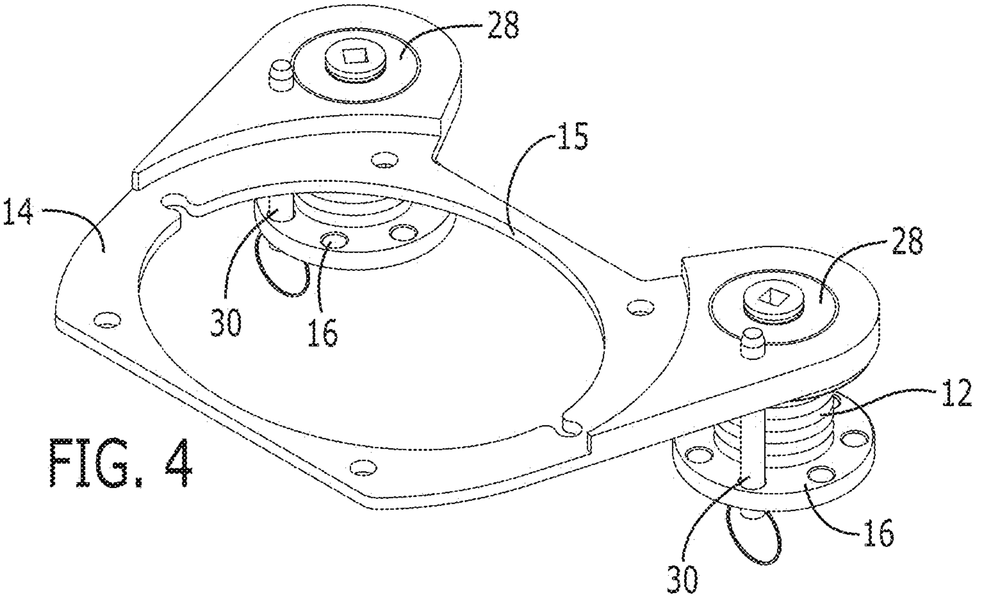
FIG. 4 is an isolated view of one embodiment of the present disclosure.
Figure 5:
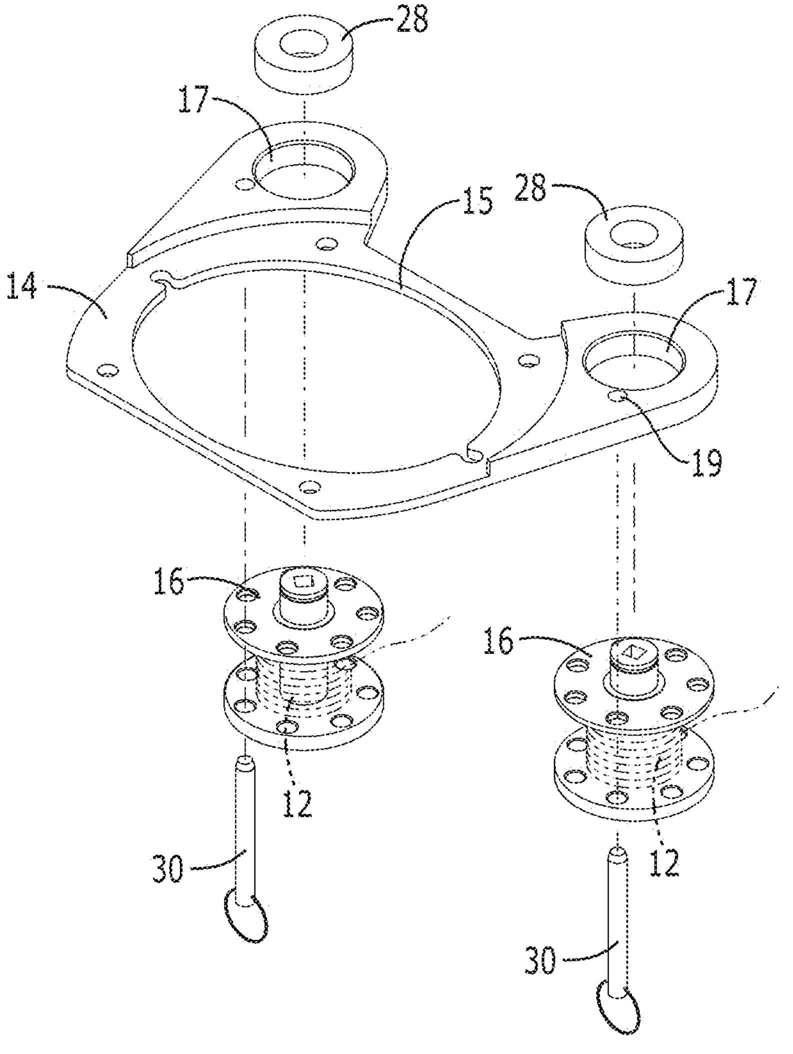
FIG. 5 is an exploded perspective view of one embodiment of the present disclosure.
Figure 6:
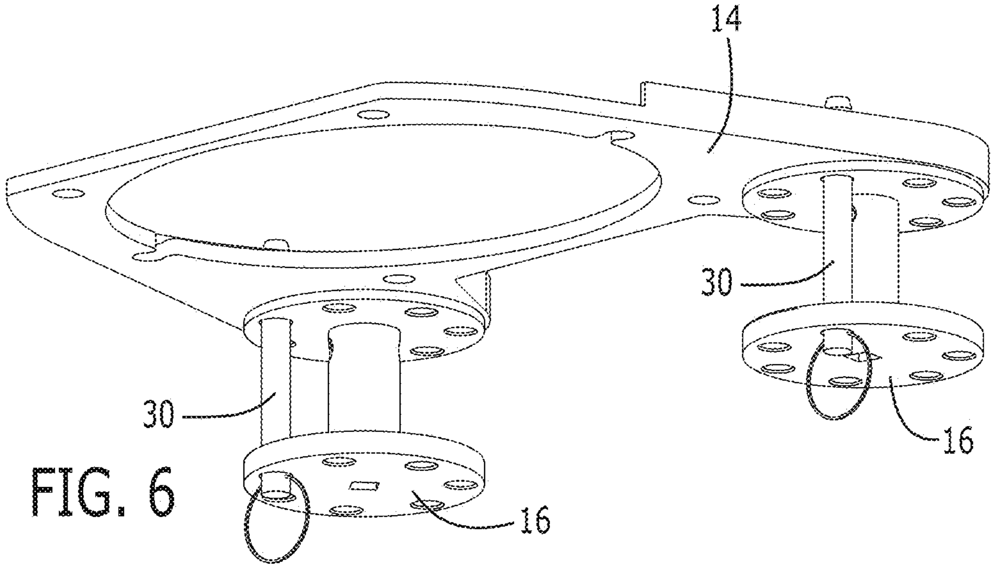
FIG. 6 is a perspective view of one embodiment of the present disclosure.

More specifically, and as shown in the Figures, the main plate 14 may have a planar top surface and a bottom surface with a recessed region, the recessed region sized to accommodate placement of the suction cup 24 therein. The large orifice 15 of the main plate 14 may extend through the main plate 14 and may be concentrically aligned with the recessed region of the bottom surface, thus extending through a thinner part of the main plate 14. The two smaller orifices 17 may extend through a portion of the main plate 14 with a larger thickness than the portion through which the large orifice 15 extends. As shown in FIG. 3, the large orifice 15 may be round. For example, the large orifice 15 may be a circular or ellipse-shaped orifice with a pair of fastener notches extending outward from opposite areas thereof. Each of the smaller orifices 17 may be substantially circular. A bearing 28 may be operatively attached to and positioned within each of the smaller orifices 17, wherein the bearing 28 may have a central opening configured to accommodate insertion of a central protrusion extending from a bottom surface of the spool 16 therein. As such, the bearings 28 and engaged spools 16 may be configured to rotate within the smaller orifices 17.

Figure 7:
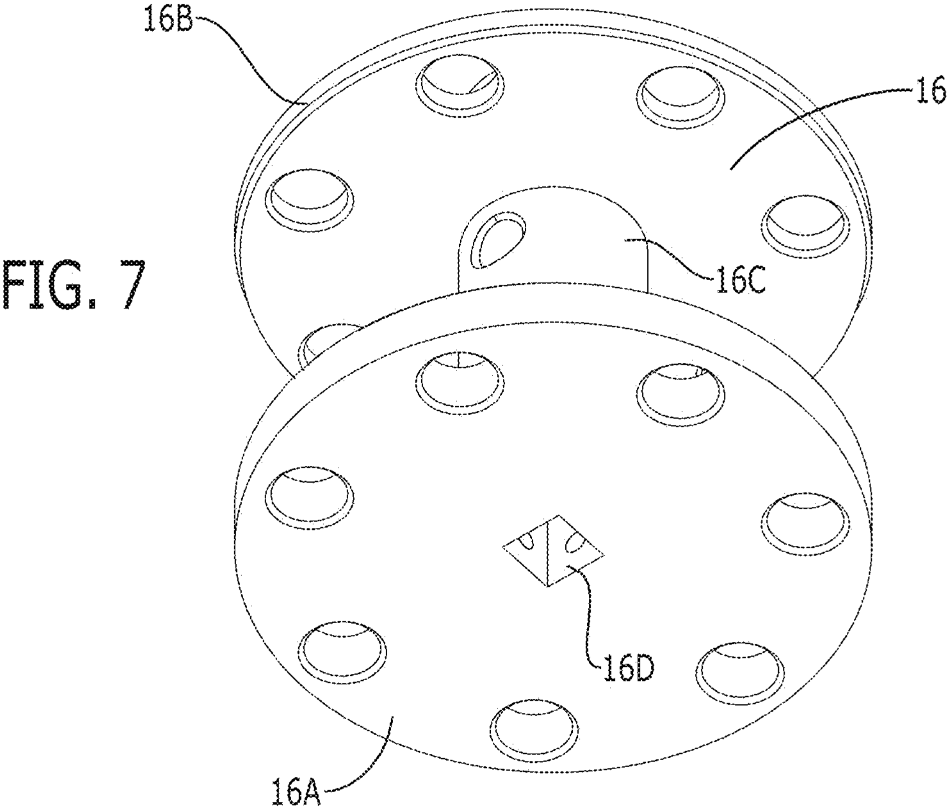
FIG. 7 is a detailed perspective view of a spool of one embodiment of the present disclosure.
Figure 8:
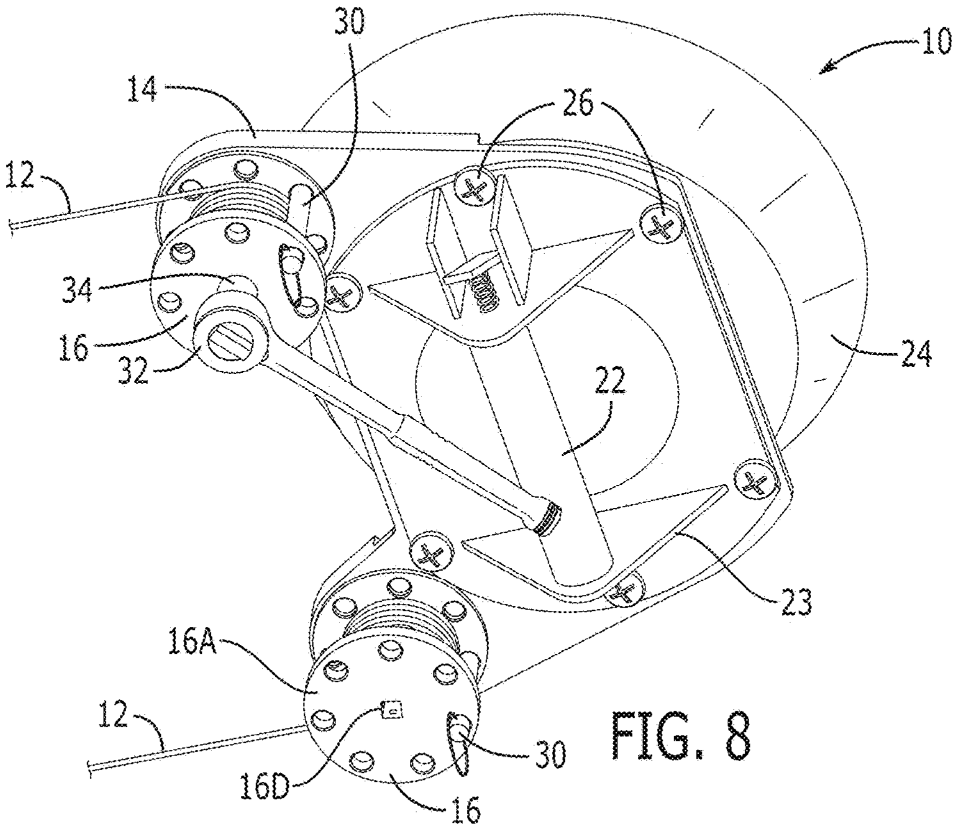
FIG. 8 is a detailed perspective view of one embodiment of the present disclosure.
Figure 10:
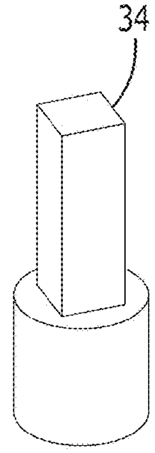
FIG. 10 is a perspective view of a socket adapter.
Figure 9:
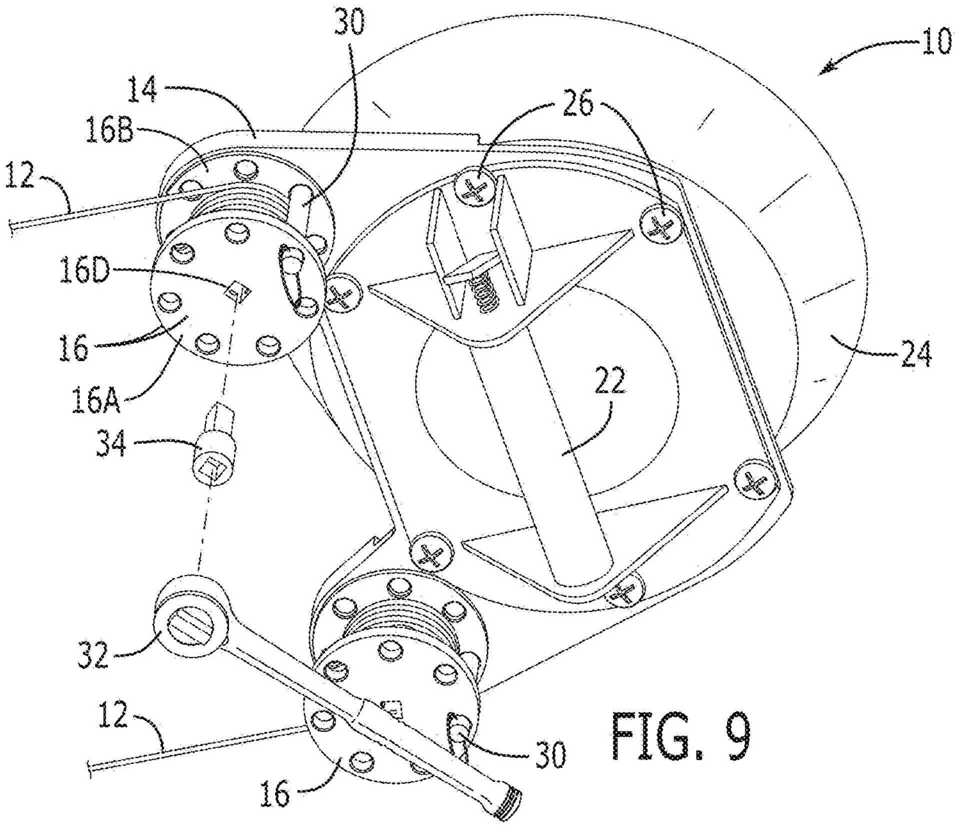
FIG. 9 is an exploded perspective view of one embodiment of the present disclosure.
Figure 11:
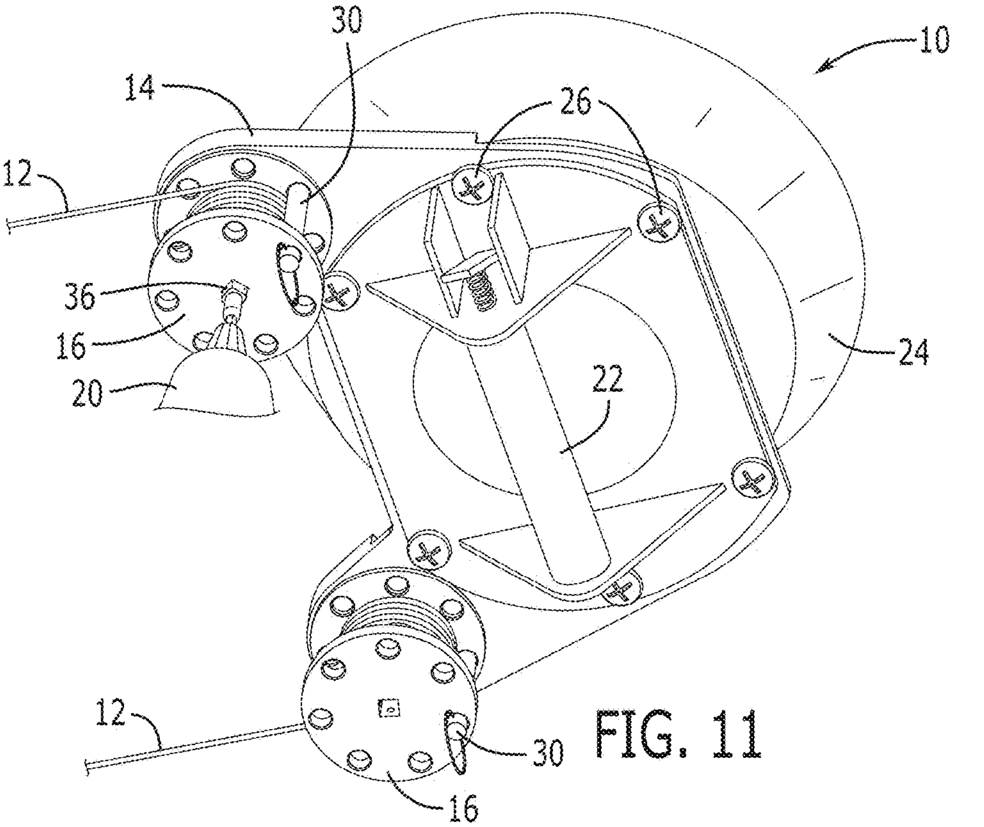
FIG. 11 is a detailed perspective view of one embodiment of the present disclosure.
Figure 13:
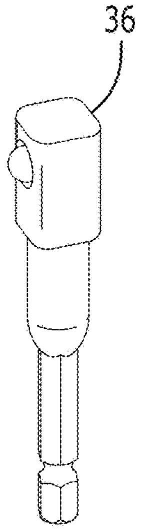
FIG. 13 is a perspective view of one embodiment of a drill adapter.
Figure 12:
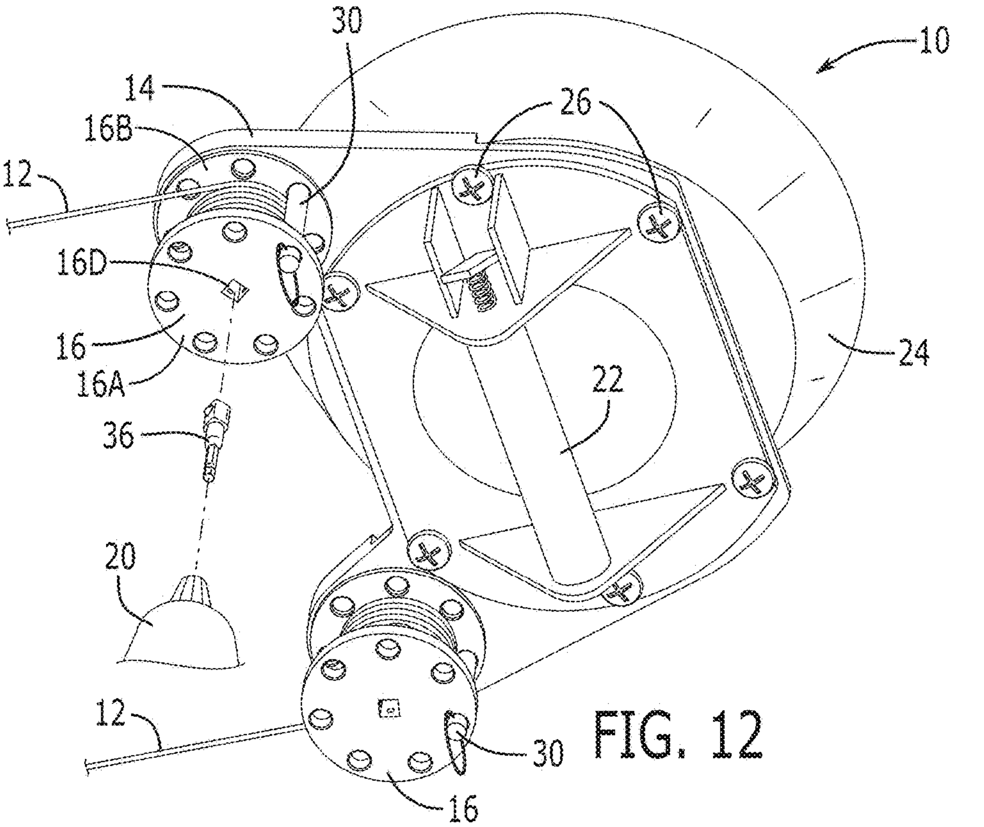
FIG. 12 is an exploded perspective view of one embodiment of the present disclosure.

As shown in detail in FIG. 7, each spool 16 may comprise a planar top flange 16A; a bottom flange 16B including the protrusion extending from an exterior surface thereof; and a shaft 16C extending between the interior surfaces of the top flange 16A and the bottom flange 16B. As shown in FIG. 7, the top flange 16A (shown at the bottom of the figure) may include an adapter port 16D extending therein, the adapter port 16D sized to accommodate insertion of an adapter 18 therein, wherein the adapter 18 may be operatively attached to a device, such as a hand drill 20 or screwdriver, that causes rotation of the adapter 18. In other embodiments, such as that shown in FIGS. 8-10, the adapter may comprise a socket adapter 34 configured to removably engage with a socket wrench 32, where the socket adapter 34 may be sized to be accommodated within the adapter port 16D. In yet further embodiments, and as shown in FIGS. 11-13, the adapter may comprise a differently shaped drill adapter 36 configured to removably engage with a drill 20, wherein the drill adapter 36 is sized to be accommodated within the adapter port 16D.

As shown in FIG. 7, each of the top flange 16A and the bottom flange 16B may comprise a plurality of pin orifices extending therethrough, wherein the pin orifices on the top flange 16A are aligned with those on the bottom flange 16B, such that a clevis pin 30 may extend therethrough. The main plate 14 may also comprise at least one pin orifice 19 extending therethrough, the pin orifice 19 being positioned adjacent to the smaller orifice 17, such that a clevis pin 30 extending through the pin orifices in the top flange 16A and the bottom flange 16B of the spool 16 may also extend through the main plate 14, thus locking the spool 16 in place with respect to the main plate 14. A length of cord 12 may be wrapped around each spool 16, such that the first end of the cord 12 is wrapped around a first spool 16 and the second end of the cord 12 is wrapped around the second spool 16.

Figure 2:
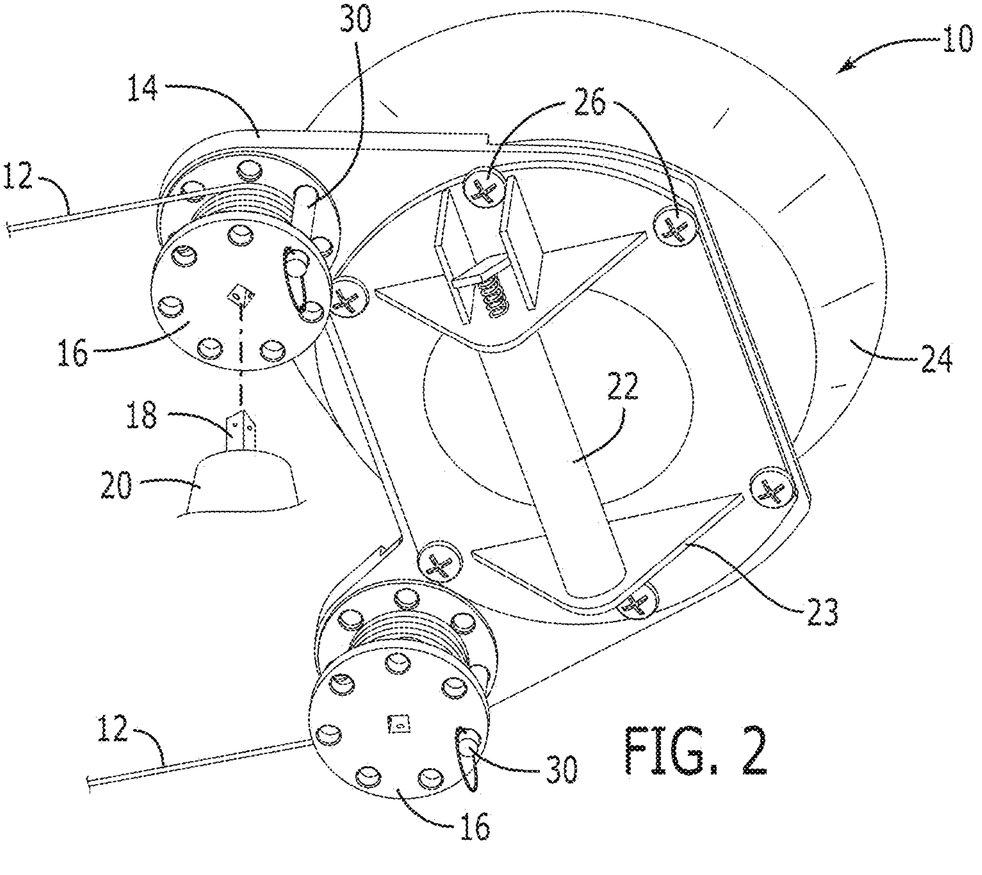
FIG. 2 is a detailed perspective view of one embodiment of the present disclosure.

As shown in FIGS. 2 and 3 and as described above, a handle plate 21 may be mounted to a top surface of the main plate 14 over the large orifice 15. The handle plate 21 may have a handle 22 extending therefrom. While the shape of the handle 22 may vary, in some embodiments and as shown in the Figures, the handle 22 may be a cylindrical rod suspended between a pair of substantially triangular supports 23 that extend substantially perpendicularly out of a top surface of the handle plate 21. While the handle plate 21 may be attached to the main plate 14 using any known fasteners, in some embodiments, the handle 21 plate is attached to the main plate 14 using a plurality of screws 26, thus making the handle 22 removable from the main plate 14. In other embodiments, the handle 22 may be integrally formed with the main plate 14.

The components of the tool 10 of the present disclosure may be made of, for example, metal. While the dimensions of the components may vary, in some embodiments, the bearings 28 may be 35 mm×17 mm×10 mm; the smaller orifices 17 may have a diameter of about 34.87 mm; the spools 16 may each have a shaft 16C that is 17.03 mm wide; the adapter port 16D in the spool 16 may be configured to accommodate insertion of a ¼ inch adapter; and the suction cup 24 may be an 8-inch suction cup.

To use the tool 10 of the present disclosure, the tool 10 may be attached to an interior surface of a windshield 11 using the suction cup 24. The cord 12 may be wrapped around the outside of the vehicle, as shown in FIG. 1. With an adapter 18 inserted into the adapter port 16D in the spool 116, the spool 16 may be turned to cut the windshield adhesive. Because of the structure of the tool 10, no special tools are required for use thereof, and the oversized spools 16 may absorb torque to prevent premature breakage of the cord 12. Because of the structure of the tool 10, it is the only known windshield removal tool that is capable of being used as a saw. This benefit may be specifically related to the open spools 16.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A windshield removal tool for removing a windshield from a vehicle, the windshield removal tool comprising:

a main plate with a top surface and a bottom surface, the main plate having a large orifice and two smaller circular orifices extending therethrough;

a pair of rotatable spools, each spool supported within a respective smaller orifice of the two smaller orifices, such that the spools each extend outward from the top surface of the main plate;

a handle plate extending from the top surface of the main plate;

a suction cup engaged with the large orifice, such that the suction cup extends outward from the bottom surface of the main plate;

a clevis pin removably engaged with at least one spool of the pair of rotatable spools;

an adapter port extending into a top surface of at least one spool of the pair of rotatable spools, the adapter port configured to removably accommodate insertion of an external tool therein, the external tool configured to rotate the at least one spool; and a cord operatively attached to and extending between the pair of rotatable spools.

2. The windshield removal tool of claim 1, wherein the handle plate is mounted to the top surface of the main plate over the large orifice, and wherein a handle extends from a top surface of the handle plate.

3. The windshield removal tool of claim 2, wherein the handle comprises:

a pair of handle supports extend outward from the top surface of the handle plate; and a rod extending between the pair of handle supports.

4. The windshield removal tool of claim 2, wherein the handle plate is removably mounted to the main plate via a plurality of mechanical fasteners.

5. The windshield removal tool of claim 1, further comprising a bearing mounted within each of the two smaller orifices, wherein each spool of the pair of rotatable spools is configured to engage with a respective bearing.

6. The windshield removal tool of claim 5, wherein each spool of the pair of rotatable spools comprises:

a planar top flange;

a bottom flange including a protrusion extending from an exterior surface thereof, the protrusion configured to engage with the respective bearing; and a shaft extending between interior surfaces of the top flange and the bottom flange.

7. The windshield removal tool of claim 6, wherein the top flange includes the adapter port extending therein.

8. The windshield removal tool of claim 6, wherein:

each of the planar top flange and the bottom flange comprise a plurality of pin orifices extending therethrough;

the plurality of pin orifices on the planar top flange are aligned with the plurality of pin orifices on the bottom flange; and the clevis pin is removably engaged with the plurality of pin orifices.

9. The windshield removal tool of claim 8, wherein:

the main plate further comprises at least one main plate pin orifice extending therethrough, the main plate pin orifice being positioned adjacent to at least one of the small orifices, such that the clevis pin is also configured to extend through the main plate, thus locking the respective spool in place with respect to the main plate.

* * * * *